United States Patent
Burch

(10) Patent No.: US 8,046,164 B1
(45) Date of Patent: Oct. 25, 2011

(54) SYSTEMS AND METHODS FOR TRACK LOG SELECTION

(75) Inventor: Matthew C. Burch, Lawrence, KS (US)

(73) Assignee: Garmin Switzerland GmbH (CH)

( * ) Notice: Subject to any disclaimer, the term of this patent is extended or adjusted under 35 U.S.C. 154(b) by 402 days.

(21) Appl. No.: 10/071,560

(22) Filed: Feb. 8, 2002

(51) Int. Cl.
 *G01C 21/34* (2006.01)
 *G06F 17/30* (2006.01)

(52) U.S. Cl. ........ 701/205; 701/201; 701/208; 707/769; 707/822; 455/456.1

(58) Field of Classification Search ............... 707/10, 707/102, 104, 513, 769, 822; 701/210, 117, 701/120, 200, 178, 201, 208, 205; 455/456.1
See application file for complete search history.

(56) References Cited

U.S. PATENT DOCUMENTS

| | | | |
|---|---|---|---|
| 4,774,671 A | 9/1988 | Itoh et al. .................... 364/449 |
| 4,774,672 A | 9/1988 | Tsunoda et al. ............. 364/449 |
| 5,243,529 A | 9/1993 | Kashiwazaki | |
| 5,528,248 A | 6/1996 | Steiner et al. ................ 342/357 |
| 5,537,324 A | 7/1996 | Nimura | |
| 5,543,802 A | 8/1996 | Villevieille et al. .......... 342/357 |
| 5,938,721 A | 8/1999 | Dussell et al. ................ 701/211 |
| 5,946,687 A | 8/1999 | Gehani et al. | |
| 5,948,040 A | 9/1999 | DeLorme et al. | |
| 6,040,824 A | 3/2000 | Maekawa et al. ............ 345/173 |
| 6,266,612 B1 | 7/2001 | Dussell et al. ................ 701/207 |
| 6,317,684 B1 | 11/2001 | Roeseler et al. | |
| 6,317,686 B1 * | 11/2001 | Ran ............................... 701/210 |
| 6,317,687 B1 | 11/2001 | Morimoto et al. | |
| 6,321,158 B1 | 11/2001 | DeLorme et al. ............ 701/201 |
| 6,411,899 B2 | 6/2002 | Dussell et al. ................ 701/211 |
| 6,801,855 B1 | 10/2004 | Walters et al. | |
| 2002/0013815 A1 | 1/2002 | Obradovich et al. | |
| 2002/0052689 A1 | 5/2002 | Yamashita et al. | |
| 2003/0145005 A1 * | 7/2003 | Blair et al. ..................... 707/10 |
| 2003/0182052 A1 * | 9/2003 | DeLorme et al. ............ 701/201 |

OTHER PUBLICATIONS

Walters, T., et al., "Portable Navigation Device With Integrated GPS and Dead Reckoning Capabilities", U.S. Appl. No. 10/184,844, filed Jun. 28, 2002.

* cited by examiner

*Primary Examiner* — Belix M Ortiz

(74) *Attorney, Agent, or Firm* — Samuel M. Korte

(57) ABSTRACT

Systems, devices and methods are provided for selecting a desired track log from a set of track log points so as to provide electronic systems, such as navigational aid devices, with the capability of more powerful and flexible applications. In one embodiment, a desired first endpoint and a desired second endpoint are specified for a desired track log. An actual first endpoint is assigned based on the desired first endpoint and a set of track log points. An actual second endpoint is assigned based on the desired second endpoint and the set of track log points. The desired track log is identified using the actual first endpoint, the actual second endpoint, and at least one track log point. At least one of the desired first endpoint and the desired second endpoint is capable of being specified by specifying a location. Other aspects and embodiments are provided herein.

7 Claims, 15 Drawing Sheets

Choose Exact Time — 1122

Start: [Time] [Date]
End: [Time] [Date]

FIG. 11

Choose Location — 1224
How do you want to specify location?
[▽ MANUAL] — 1226
[OK] 1228  [Cancel] 1230

FIG. 12

1326
MANUAL — 1328
MAP FEATURE — 1330
ADDRESS — 1332
WAYPOINT — 1334

FIG. 13

SYSTEMS AND METHODS FOR TRACK LOG SELECTION

FIELD OF THE INVENTION

The present invention relates generally to navigational aid devices and, more particularly, to systems and methods for selecting a desired track log from a set of track log points.

BACKGROUND OF THE INVENTION

Track logs are used in navigational aid devices to provide an indication of where the device has been. One description of a track log is an array of points used to track a location of the navigational aid device. Track logs may be visualized as a trail of electronic bread crumbs, where each bread crumb is a track log point that identifies the time and position of the device.

One type of navigational aid device in which track logs have been used is a device with Global Positioning System (GPS) capabilities. For one of these devices with GPS capabilities, one description of a segment start point for a device with GPS capabilities is the first point recorded after the unit obtains a satellite fix. A device that stays powered-on may lose and regain its satellite fix multiple times and thus record multiple segments per session. As such, the segment start point may not be the first point recorded after powering-on the device.

An active track log is one that is currently being recorded by the device. It is known to extract an end portion of an active track log by presenting a user with a menu that shows the times of the recorded segment start points, and then saving the range of track points between the time the user selects and the most recently recorded track point in the active track log. Known track log points include position information (such as latitude and longitude information), a timestamp, and a flag that specifies whether the track log point is a segment start point for a track log. The flag is used to identify the segment start point in order to extract the end portion of an active track log.

Therefore, there exists a need for systems and methods that are not limited to selecting track logs from an end portion of an active track log so as to allow more powerful and flexible applications for the navigational aid devices.

SUMMARY OF THE INVENTION

The present invention addresses problems with track log selection, and will be understood by reading and studying the following specification. The systems, devices and methods of the present invention allow a desired track log to be selected from any portion of a set of track log points so as to provide electronic systems, such as navigational aid devices, with the capability of more powerful and flexible applications.

One aspect provided herein is a method. In one embodiment, a desired first endpoint and a desired second endpoint are specified for a desired track log. An actual first endpoint is assigned based on the desired first endpoint and a set of track log points. An actual second endpoint is assigned based on the desired second endpoint and the set of track log points. The desired track log is identified using the actual first endpoint, the actual second endpoint, and at least one track log point. At least one of the desired first endpoint and the desired second endpoint is capable of being specified by specifying a location.

One aspect provided herein is a navigational aid device. According to one embodiment, the device includes a processor and a memory adapted to communicate to the processor. A set of track log points is contained within the memory of the device. The device is configurable in one embodiment. One embodiment of the device is adapted to determine a user-selected method for specifying a time of at least one track log endpoint. The choices include a method for specifying a location and extracting a time from the specified location, and at least one other method for specifying the time of at least one track log end point. User-specified desired endpoints for a desired track log are received using one or more of the methods for specifying a time of at least one track log endpoint. Actual endpoints for the track log are assigned based on a time for the desired endpoints and a set of track log points. The desired track log is determined, identified, saved, or incorporated into device applications using the actual endpoints and at least one track log point from the set of track log points.

These and other aspects, embodiments, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIG. 11 illustrates one example of an interface for choosing an exact time;

FIG. 12 illustrates one example of an interface for choosing a location;

FIG. 13 illustrates one example of a pop-up or pull-down menu for interface shown in FIG. 12 for choosing a location;

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to systems, devices and methods for identifying a desired track log from a set of track log points. The present invention provides features that allow a user to select desired endpoints for the desired track log, such that the desired track log is not limited to the end portion of an active track log. The features of the present invention also provide the capability of selecting at least one of the desired endpoints from a location. The systems, devices and methods of the present invention allow electronic systems, such as navigational aid devices, to provide more powerful and flexible applications.

Figure 1:
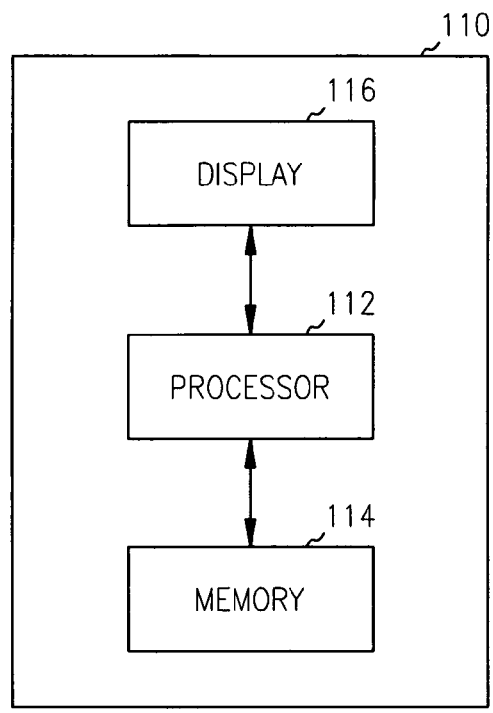
FIG. 1 is a block diagram of components for an electronic navigational aid device.

FIG. 1 is a block diagram of components for an electronic navigational aid device. The device 110 includes a processor 112 and a memory 114 adapted to communicate to the processor 112. The memory 114 includes a set of track log points. According to various embodiments, the device either forms or otherwise acquires the set of track log points stored in the memory 114. The memory is capable of including instructions to be performed by the processor 112, and is capable of including other data, such as cartographic data and addresses, to be operated on by the device for various applications. Cartographic data includes, but is not limited to map features and waypoints. Examples of map features include parks and tourist destinations that are specifically called out on electronic maps. Waypoints are used in electronic map applications as intended destinations, points of interest and to build routes, for example. A waypoint, in general, can be any identified location such as coordinates or an electronic map feature. Examples of waypoints include restaurants, stores, or other points of interest for a particular user. One embodiment of the device 110 further includes a display 116 adapted to communicate to the processor 112. The device 110 is capable of presenting track logs, track log points, and other data on the display 116.

As will be illustrated in more detail below with respect to flow diagrams of FIGS. 3-8 and the interface examples of FIGS. 9-15, the device 110 is capable of selecting or identifying a desired track log based on first and second user-specified desired endpoints. At least one of the first and second user-specified desired endpoints is capable of being selected by a user-specified location.

As will be illustrated in more detail below with respect to FIGS. 16-20, the device 110 is capable of incorporating a variety of technology, and is capable of being incorporated in a variety of systems. For example and without limitation, the device 110 is capable of taking the form of or incorporating a portable navigational aid device, a cellular navigational aid device such as a cell phone, a GPS receiver device, a Personal Digital Assistant (PDA) device, intelligent apparel, and the like.

Figure 2:
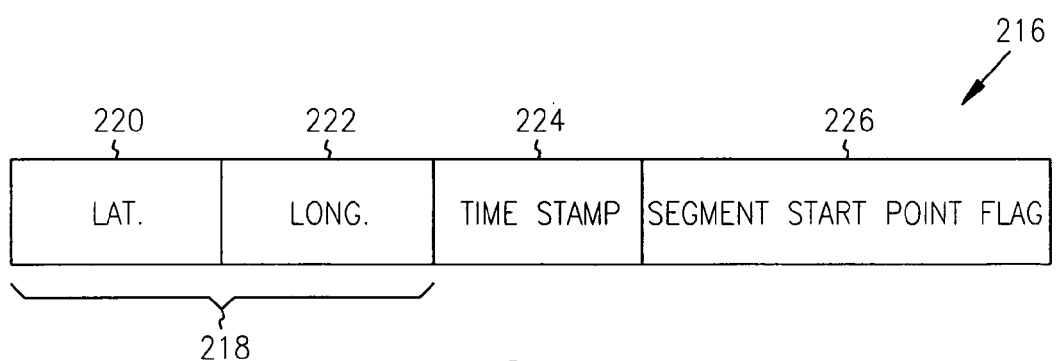
FIG. 2 is one embodiment of a data structure for a track log point according to the present invention.

FIG. 2 is one embodiment of a data structure for a track log point according to the present invention. Each track log point functions as an electronic bread crumb. A set of track log points are capable of forming a track log, which can be considered to be a trail of electronic bread crumbs. The data structure 216 includes a field representing a position 218, which is illustrated as a field representing a latitude 220 and a field representing a longitude 222. One of ordinary skill in the art will appreciate that, by incorporating a field representing an altitude (not shown), the data structure is able to identify a three-dimensional position. The data structure 216 also includes a field representing a time stamp 224. As such, the data structure 216 associates a position with a time. In one electronic device application that uses this data structure, the data structure 216 associates a position of the electronic device, such as device 110 in FIG. 1, with a time at which the electronic device is at the position. The data structure 216 also includes a field that represents a segment start point flag 226, which identifies whether the track log point is a start point of a previously recorded segment of a track log. A desired track log is capable of being determined or identified by using two track log points that are flagged as segment start points, and at least some of the track log points that extend between the two segment start points. A segment start point, as used herein, represents the first point recorded since the last satellite fix acquired. Segment start points are capable of serving as a way of locating various subset of an active track log, such as one trip within a series of recorded trips.

Figure 3:
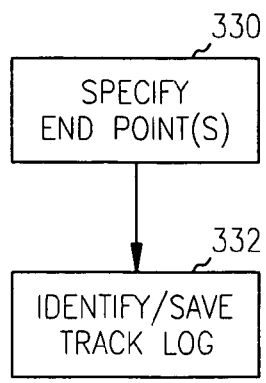
FIG. 3 is a flow diagram of one method embodiment according to the present invention.

FIG. 3 is a flow diagram of one method embodiment according to the present invention. According to this embodiment, endpoints for a desired track log are specified at 330. these endpoints are capable of being characterized to include first and second desired endpoints or starting and ending desired endpoints. The identified or determined track log is identified or determined at 332 using the specified endpoints and a set of track log points. The track log is capable of being saved, or incorporated into an application that uses track logs. Because more than one endpoint is used to determined the desired track log, the desired track log is not limited to the end portion of an active track log.

Figure 4:
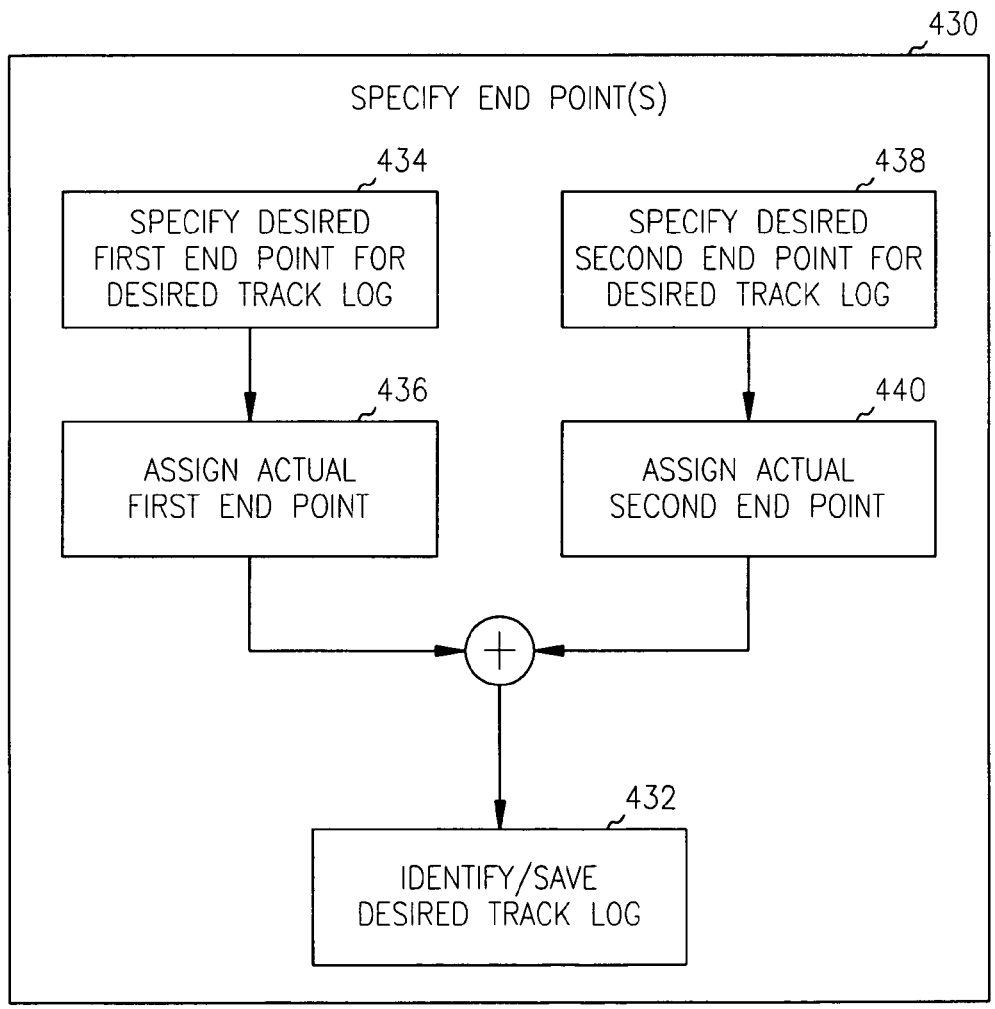
FIG. 4 is a flow diagram of one method embodiment according to the present invention.

FIG. 4 is a flow diagram of one method embodiment according to the present invention. Endpoints are specified at 430, which generally corresponds to 330 in FIG. 3. The track log is identified or determined at 432, which generally corresponds to 332 in FIG. 3. In one embodiment, the endpoints are specified at 430 using the following procedure. At 434, a desired first endpoint for a desired track log is specified. It is noted here that the specified desired first endpoint may or may not directly correspond to one of the track log points in the set of track log points. For example, if the desired endpoint is selected from a list of track log points, then the endpoint directly corresponds to one of the track log points. However, if a location or an "arbitrary" time is selected, then the desired endpoint likely will not directly correspond to one of the track log points. Therefore, an actual first endpoint is assigned at 436 based on the specified desired first endpoint and the set of track log points. This assigned actual endpoint may sometimes be the same as the desired endpoints, as is the case when the desired endpoint is selected from a list of track log points, and often will not be the same as the desired endpoints. In one embodiment, for example, the assigned actual endpoint is the closest to the desired endpoint. At 438, a desired second endpoint for a desired track log is specified. Since the specified desired second endpoint may or may not correspond directly to one of the track log points in a set of track log points, an actual second endpoint is assigned at 440 based on the specified desired second endpoint and the set of track log points. One of ordinary skill in the art will understand upon reading and comprehending this disclosure that the functions represented by 434, 436, 438 and 440 do not have to be performed in the order described. For example and without limitation, the first endpoint and the second endpoint are capable of being specified (434 and 438), and then actual first and second endpoints are capable of being assigned (436 and 440). The desired track log is identified or determined at 432 using the assigned actual endpoints, and a set of track log points that extend between the assigned actual endpoints.

Figure 5:
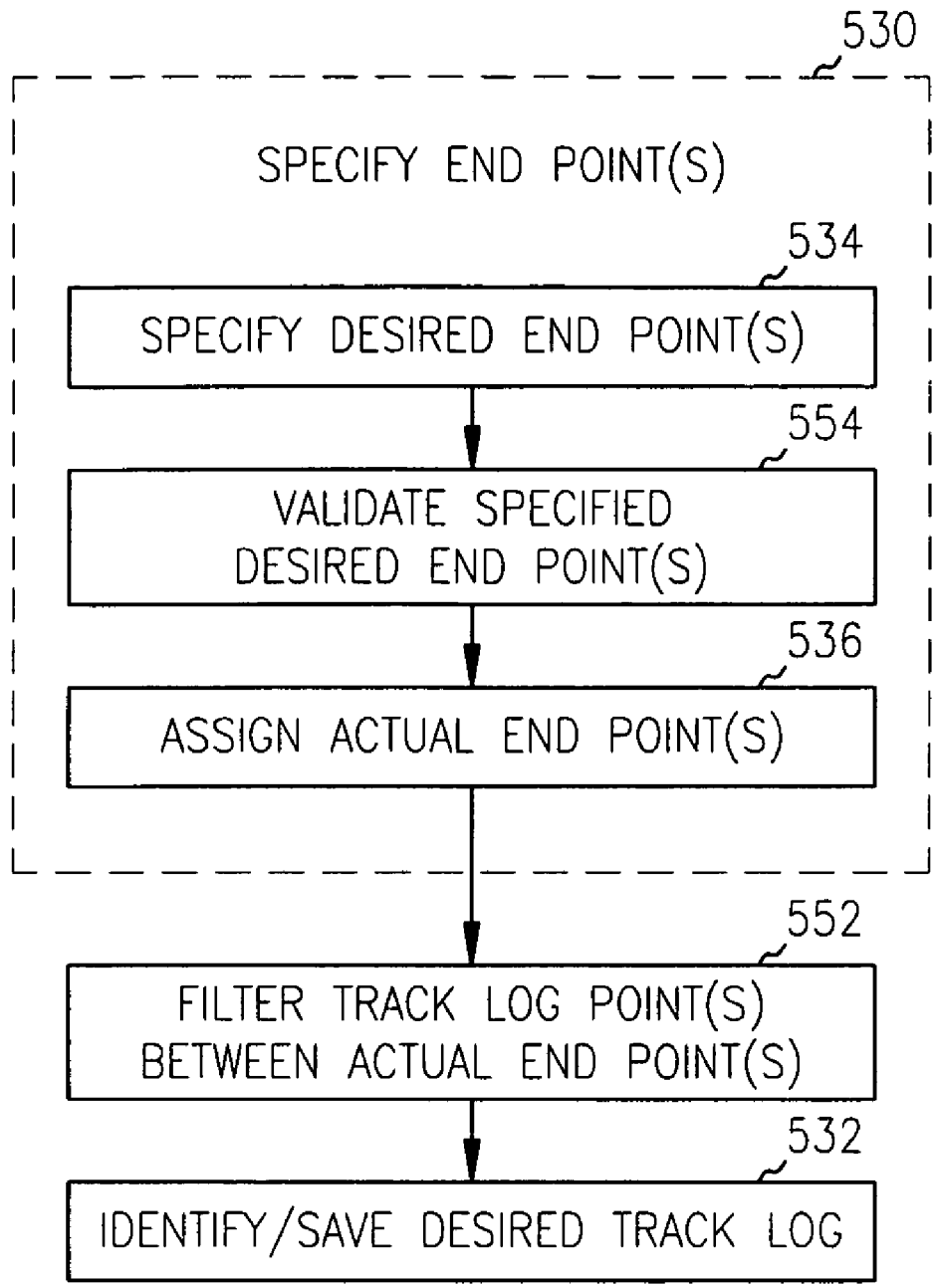
FIG. 5 is a flow diagram of one method embodiment according to the present invention.

FIG. 5 is a flow diagram of one method embodiment according to the present invention. Endpoints are specified at 530, which generally corresponds to 330 in FIGS. 3 and 430 in FIG. 4. The track log is saved, identified or determined at 532, which generally corresponds to 332 in FIGS. 3 and 432 in FIG. 4. In one embodiment, the set of track log point(s) between the assigned actual endpoints are filtered at 552 to provide a set of filtered track log point(s) that provide a good fit for the track with a reduced number of track log point(s). It is noted that the present invention does not require that the set of track log point(s) are filtered. In one embodiment, endpoints are specified at 530 using the following procedure. Desired endpoint(s) are specified at 534, which generally corresponds to 434 and 438 in FIG. 4. The desired endpoint(s) are validated at 554. In one embodiment, one desired endpoint is characterized as a starting endpoint and another desired endpoint is characterized as an ending endpoint. The starting endpoint and the ending endpoint are validated to check that the specified ending endpoint follows the specified starting endpoint. At 536 (which generally corresponds to 436 and 440 in FIG. 4), actual endpoints are assigned based on the validated, specified desired endpoints and the set of track log points because the specified desired endpoints may or may not correspond directly to one of the track log points in a set of track log points.

Figure 6:
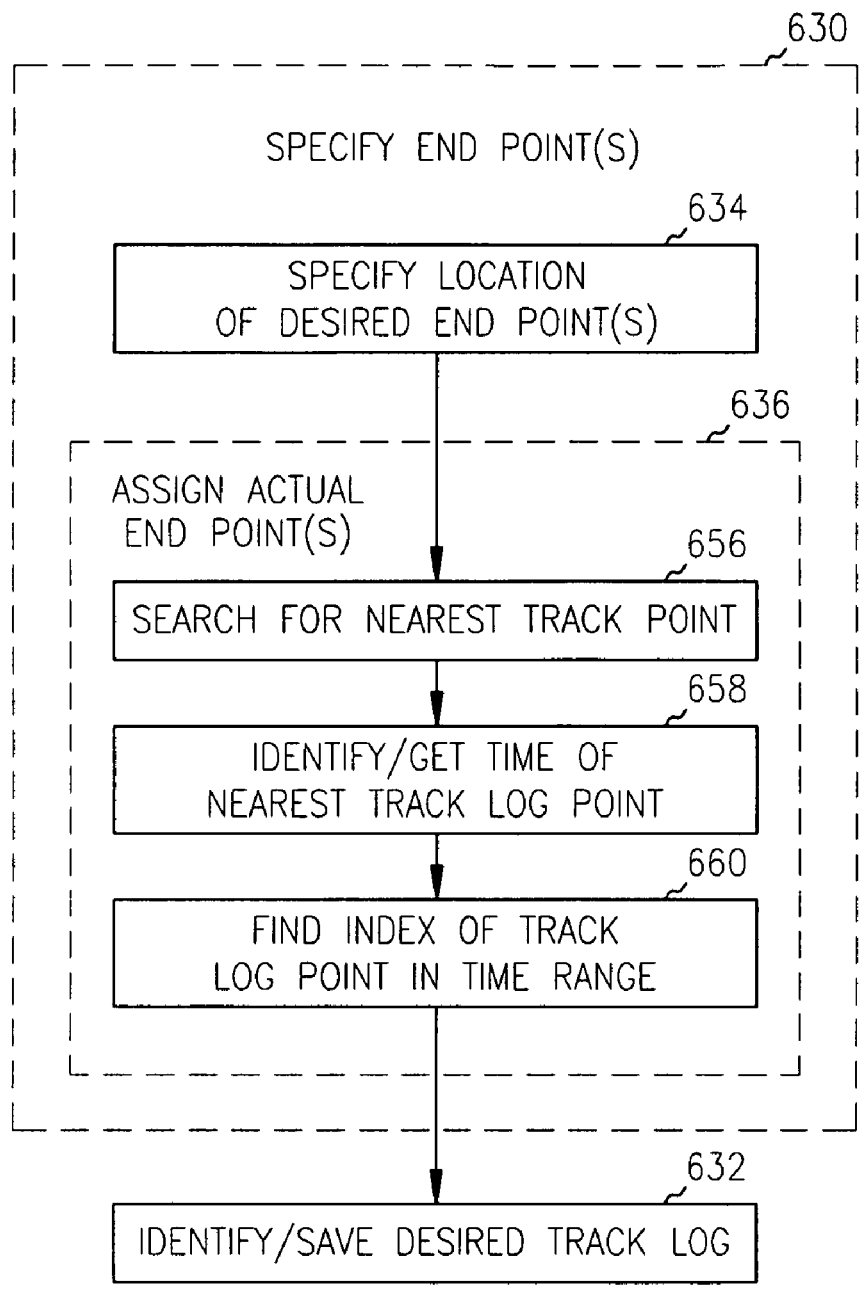
FIG. 6 is a flow diagram of one method embodiment according to the present invention.

FIG. 6 is a flow diagram of one method embodiment according to the present invention. Endpoints are specified at 630, which generally corresponds to 330 in FIG. 3, 430 in FIGS. 4 and 530 in FIG. 5. The track log is saved, identified or determined at 632, which generally corresponds to 332 in FIG. 3, 432 in FIG. 4, and 532 in FIG. 5. In one embodiment, endpoints are specified at 630 using the following procedure. The location of desired endpoint(s) are specified at 634, which generally corresponds to 434 and 438 in FIGS. 4 and 534 in FIG. 5. At 636 (which generally corresponds to 436 and 440 in FIG. 4 and 536 in FIG. 5), actual endpoints are assigned based on the specified location of the desired endpoints and the set of track log points because the specified desired endpoints may or may not correspond directly to one of the track log points in a set of track log points. In one embodiment, the actual endpoints are assigned at 636 by the following procedure. At 656, a search is performed for a nearest track point with respect to the specified location. This search is capable of being performed based on various criteria. One criteria example will be discussed below with respect to FIG. 15. The time of the nearest track log point is identified at 658, which in one embodiment takes the form of a software Get function. At 660, an index of a track log point is found in a time range. Indices in the time range identify endpoints such that the desired track log is capable of being identified in the time range to include data between the indices.

Figure 7:
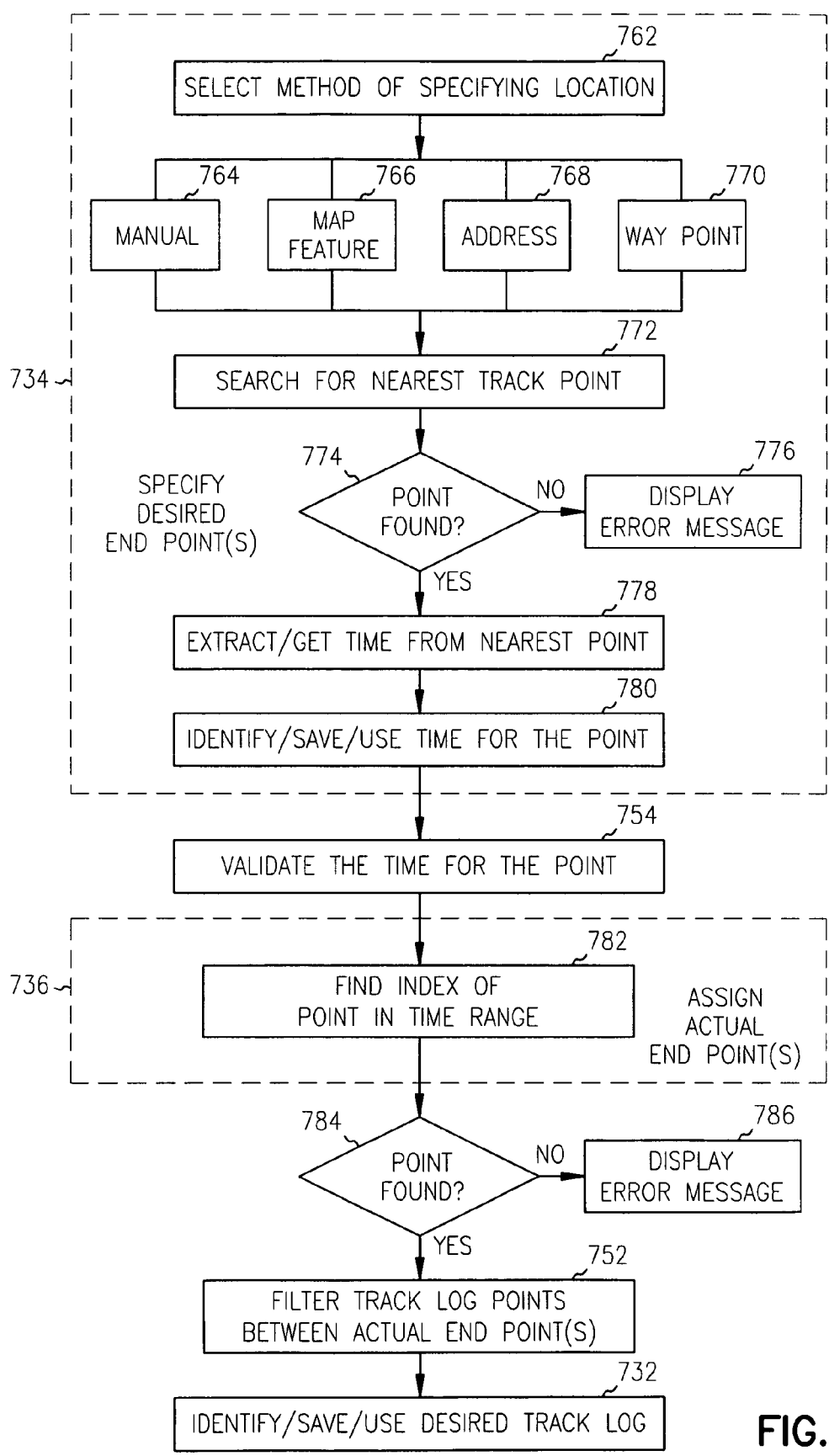
FIG. 7 is a flow diagram of one method embodiment according to the present invention.

FIG. 7 is a flow diagram of one method embodiment according to the present invention. Reference numbers in FIG. 7 generally correspond to like reference numbers in previous figures. In one embodiment, desired endpoints are specified at 734, the endpoints are validated at 754; actual endpoints are assigned at 736, the track log points between actual endpoints are filtered at 752, and the desired track log is identified, saved or used in an application at 732.

In one embodiment, endpoints are specified at 734 using the following procedure. A method of specifying a location is selected at 762. According to one embodiment, a location is capable of being selected manually 764, using a map feature 766, using an address 768 and/or using a waypoint 770. One embodiment for manually selecting a location involves identifying or pointing to a location on an electronic map. According to various embodiments, such a method for manually selecting a location includes positioning a cursor on an electronic map or tapping a touch-sensitive screen that is displaying the electronic map with a stylus. Other methods for manually selecting a location, such as by manually entering location coordinates, are encompassed and intended to be represented at 764. Upon specifying a location, a search for a nearest track point is performed at 772 with respect to the specified location. This search is capable of being performed based on various criteria. One criteria example will be discussed below with respect to FIG. 15. At 774, it is determined whether a nearest point is found. An error message is displayed at 776 upon determining that a nearest point is not found at 774. The time associated with the nearest point is extracted at 778, such as by a software Get function for example, upon determining that a nearest point is found at 774. The time associated with the point is identified, saved and/or used at 780. The time associated with the nearest point is validated at 754. At 782, an index of the point is found in the time range. Finding an index of the point in the time range generally corresponds to assigning an actual end point based on the specified location for the desired end point. At 784 it is determined whether an index point is found. Upon determining that an index point is not found at 784, an error message is displayed at 786. Upon determining that an index point is found at 784, one embodiment filters the track log points between actual endpoints at 752. The desired track log is identified, saved or otherwise used for an application at 732.

Figure 8:
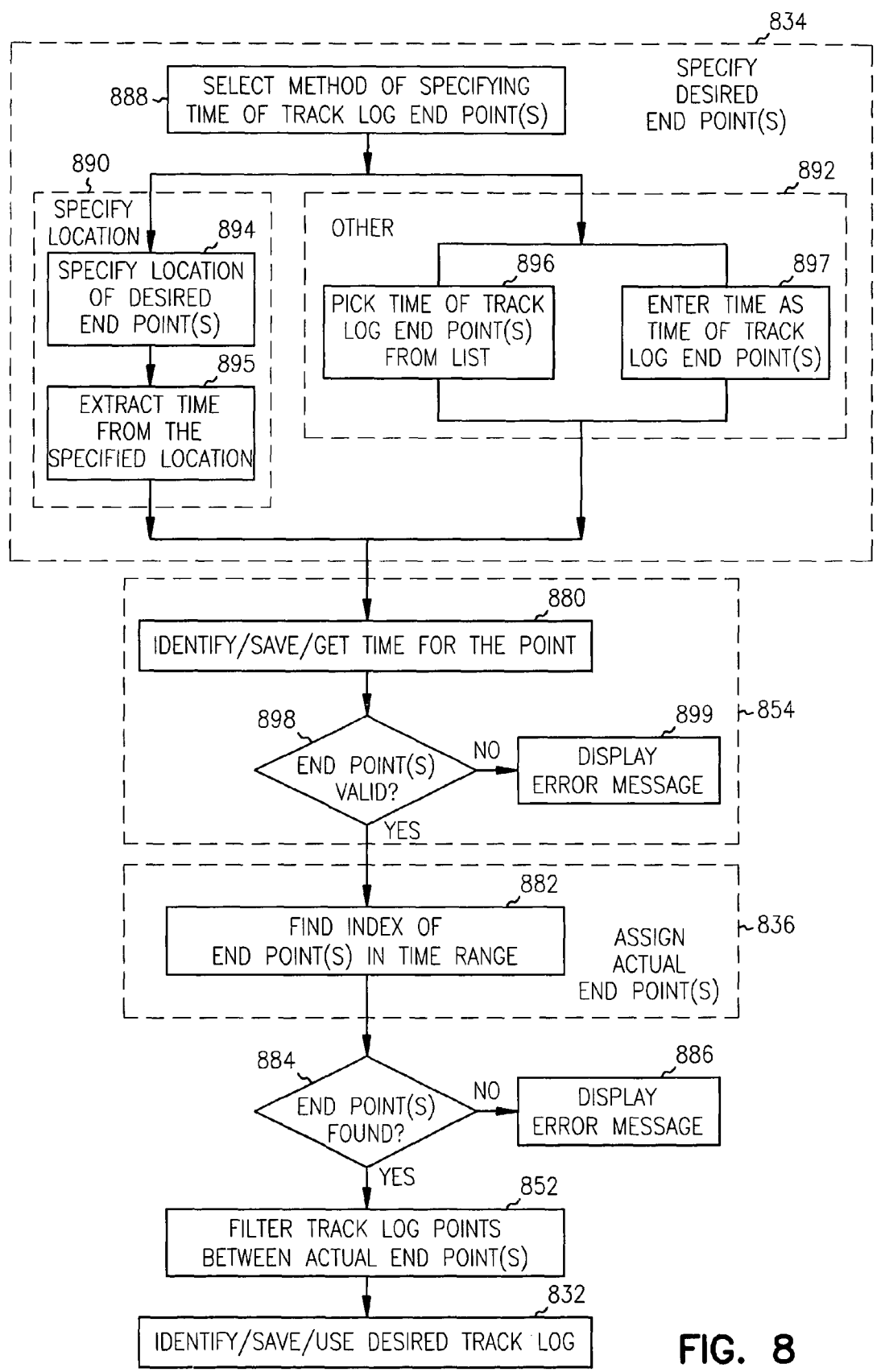
FIG. 8 is a flow diagram of one method embodiment according to the present invention.

FIG. 8 is a flow diagram of one method embodiment according to the present invention. Reference numbers in FIG. 8 generally correspond to like reference numbers in previous figures. In one embodiment, desired endpoints are specified at 834, the endpoints are validated at 854, actual endpoints are assigned at 836, the track log points between actual endpoints are filtered at 852, and the desired track log is identified, saved or used in an application at 832.

In one embodiment, endpoints are specified at 834 using the following procedure. A method for specifying time of track log endpoint(s) is selected at 888. One method for specifying time of track log endpoint(s) involves specifying a location at 890, which includes specifying a location of desired endpoint(s) at 894, and extracting a time associated with the specified location of the desired endpoint(s) at 895. Other methods for specifying time of track log endpoint(s) involves: at 896, picking or selecting a time of track log endpoint(s) from a list; and at 897, entering a time as the time of track log endpoint(s). The time associated with the point is identified, retrieved and/or saved at 880. The time associated with the endpoint is validated at 854. Upon determining that the time associated with the endpoint is not valid at 898, an error message is displayed at 899. Upon determining that the time associated with the end point is valid at 898, actual endpoints are assigned at 836. At 882, an index of the point is found in the time range. Finding an index of the point in the time range generally corresponds to assigning an actual end point based on the specified location for the desired endpoint. Upon determining that index endpoint(s) are not found at 884, an error message is displayed at 886. In one embodiment, upon determining that index endpoint(s) are found at 884, the track log points between actual endpoints(s) are filtered. However, such filtering is not required. The desired track log is identified, saved or otherwise used for an application at 732.

Various method embodiments have been described above in varying levels of detail with respect to FIGS. 3-8. Various interface examples are shown and described with respect to FIGS. 9-15. These interfaces are capable of operating on the device 110 of FIG. 1, and are useful in performing the methods shown and described with respect to FIGS. 3-8.

Figure 9:
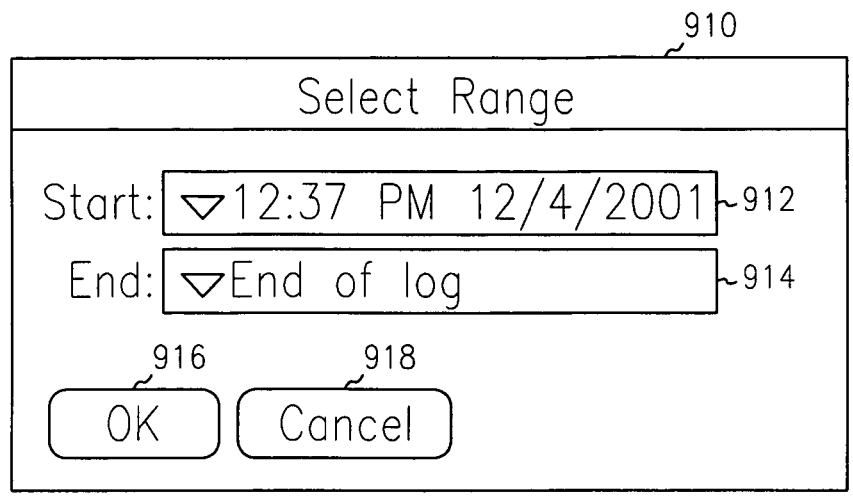
FIG. 9 illustrates one example of an interface for selecting a range of the track log.

FIG. 9 illustrates one example of an interface for selecting a range of the track log. According to one embodiment, a user is presented with a dialog box 910 that has two pop-up or pull-down menus. One pop-up menu 912 is for specifying the start or starting time for the track log range and the other pop-menu 914 is for specifying the end or ending time for the track log range. Tapping on the OK button 916 accepts the newly selected range and closes the window. In the illustrated example, the selected range for the desired track log extends between 12:37 PM on Dec. 4, 2001 and the end of the active track log. Tapping on the Cancel button 918 closes the window without accepting the newly selected range.

Figure 10:
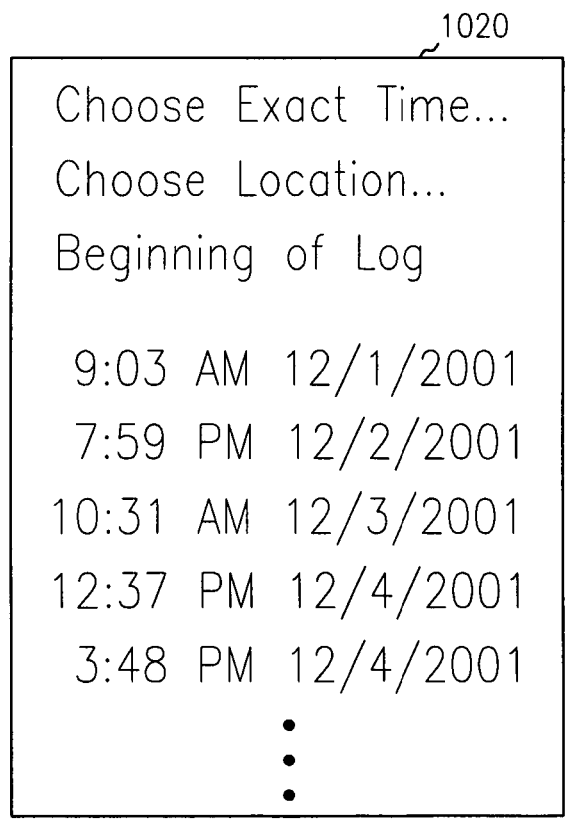
FIG. 10 illustrates one example of a pop-up or pull-down menu for the start time selected within the interface of FIG. 9.

FIG. 10 illustrates one example of a pop-up or pull-down menu for the start time selected within the interface of FIG. 9. Options contained within the popup menu 1020 include "Choose Exact Time", "Choose Location", "Beginning of Log", "End of Log", and a set of track log points extending between the "Beginning of Log" and "End of Log." According to one embodiment, the set of track log points extending between the "Beginning of Log" and "End of Log" is limited to track log segment start points so as to limit the number of available track log points for the convenience of a user. In the illustrated embodiment, only the timestamp associated with the location is listed. According to one embodiment, the "Choose Exact Time" option leads to a dialog box in which the user can type in an exact date and time. If the "Choose Location" option is chosen the device provides a query or question window in which the user is asked how the location is to be specified. One embodiment of the present invention provides the capability of specifying location by finding a map feature, an address, and/or a user waypoint using a Find interface. One embodiment of the present invention provides the capability of specifying location by displaying a map dialog such that the location can be manually specified using the displayed map dialog.

FIG. 11 illustrates one example of an interface for choosing an exact time. Tapping on the "Choose Exact Time" line in FIG. 10 displays the Choose Exact Time interface 1122 illustrated in FIG. 11. According to one embodiment, one or both of the starting time and the ending time are adapted to receive a user-specified time and date. This user-specified time and date does not necessarily correspond directly to the time and date of an actual track log point, as illustrated in the list shown in FIG. 10. However, actual track log points are able to be identified as the actual starting and ending endpoints for the range of the track log based on the entered time and date.

FIG. 12 illustrates one example of an interface for choosing a location. According to one embodiment, a user is presented with a dialog box 1224 that has one pop-up or pull-down menu 1226 for specifying how the location is to be specified for either the starting or ending endpoint, as determined by whether a user navigated to the present interface 1224 through the starting or ending menu in FIG. 9. Tapping on the OK button 1228 accepts the method for specifying a location and closes the window. Tapping on the Cancel button 1230 closes the window without accepting the newly selected range.

FIG. 13 illustrates one example of a pop-up or pull-down menu for the interface shown in FIG. 12 for choosing a location. In this embodiment, the menu 1326 provides four ways to chose a location, including manually identifying or choosing a location 1328, using a map feature 1330, using an address 1332, and using a waypoint 1334. Upon tapping Map Feature, Address or Waypoint, a Find interface (not shown) is provided to allow a user to find the desired map feature, address or waypoint.

Figure 14:
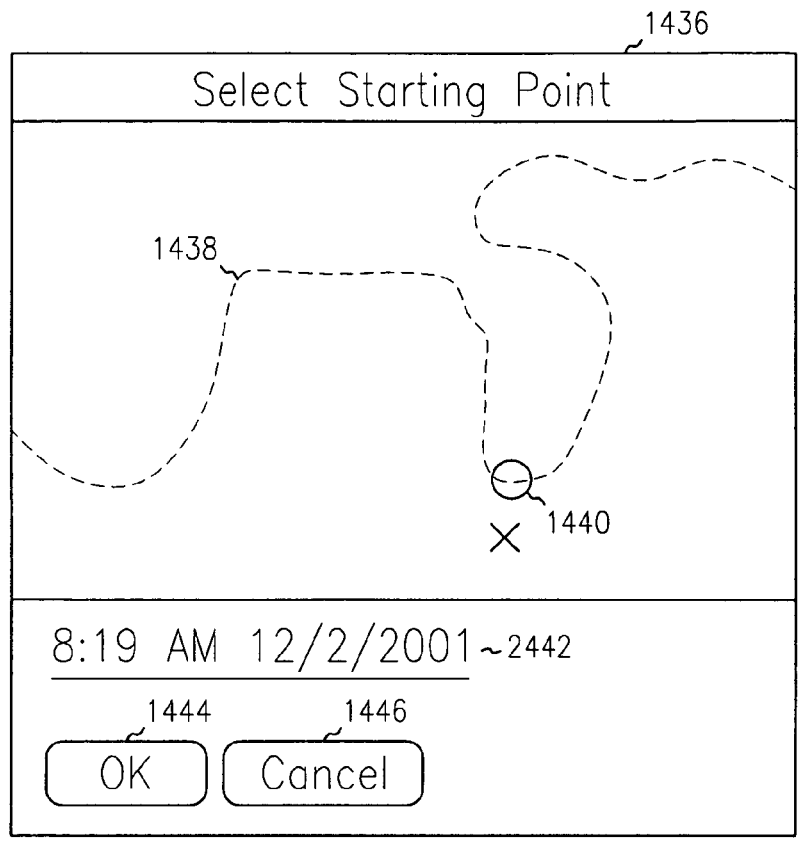
FIG. 14 illustrates one example of an interface for manually specifying endpoints for a set of track log points.

FIG. 14 illustrates one example of an interface for manually specifying endpoints for a set of track log points. The illustrated interface 1436 indicates that the interface is providing a means for selecting a starting endpoint because a user navigated to the present interface 1436 through the starting menu in FIG. 9. In one embodiment, this interface 1436 is displayed upon tapping Manual in the menu 1326 illustrated in FIG. 13. The interface 1436 of this embodiment includes an electronic map. According to this embodiment, the track log 1438 is displayed on the electronic map as a dotted line. The electronic map is capable of being panned or zoomed. Tapping a point on the map, as shown by the X, causes the nearest track point that fits some criteria to be highlighted, as shown by the small circle 1440. The time 1442 that the selected track point 1440 was recorded is also displayed. Tapping the OK button 1444 saves the selected start point and closes the interface 1436. Tapping Cancel 1446 closes the interface 1436 without saving the selected start point. One of ordinary skill in the art will understand, upon reading and comprehending this disclosure, that an ending endpoint is capable of being found using a similar process.

Figure 15:
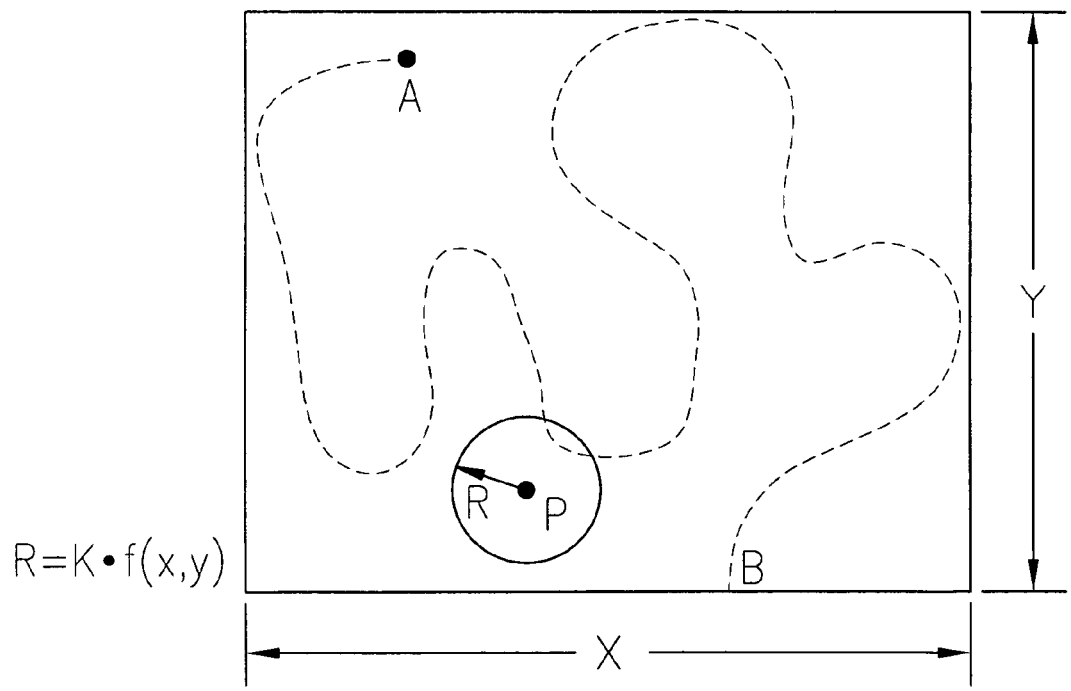
FIG. 15 illustrates one example of criteria used to search for the track point nearest to a specified point.

FIG. 15 illustrates one example of criteria used to search for the track point nearest to a specified point. Criteria is used in FIG. 14 to find the nearest track point 1440 based on a selected point (X) on the map. It is often appropriate to incorporate criteria in the search for the nearest track point because, for example, the concept of a nearest track point is not very useful for a point 500 miles away from a recorded track log which is only 10 miles long. As such, it is desirable to find the track log point that is nearest to a desired or selected point P and that is also within a certain radius R of point P. According to one embodiment, given a recorded track log which begins at point A and ends at point B and is bounded by a box that is X by Y units in dimension, the radius R is calculated as a function of X and Y.

$$R = f(X, Y)$$

For example, for an empirically determined constant k, a value for the radius R is capable of being determined by the following equation:

$$R = k \times (X + Y).$$

One of ordinary skill in the art will appreciate, upon reading and comprehending this disclosure, that there are other methods for identifying and evaluating criteria to ensure that the nearest point is meaningful for a selected point P.

The present invention has been described above with respect to an electronic device 110 illustrated in FIG. 1, and with respect to the data structure, various method embodiments, and various interfaces illustrated in FIGS. 2-15. The present invention is not so limited, however, as it is capable of being incorporated into a number of types of devices and systems, including but not limited to navigational devices, PDAs, and wireless communication systems. Some embodiments incorporate global positioning system (GPS) technology, which is capable of being used to provide the position and time of the track log points. Other embodiments operate on previously stored track log points and/or access the track log points in other non-GPS ways. Some of these devices are illustrated with respect to FIGS. 16-20.

Figure 16:
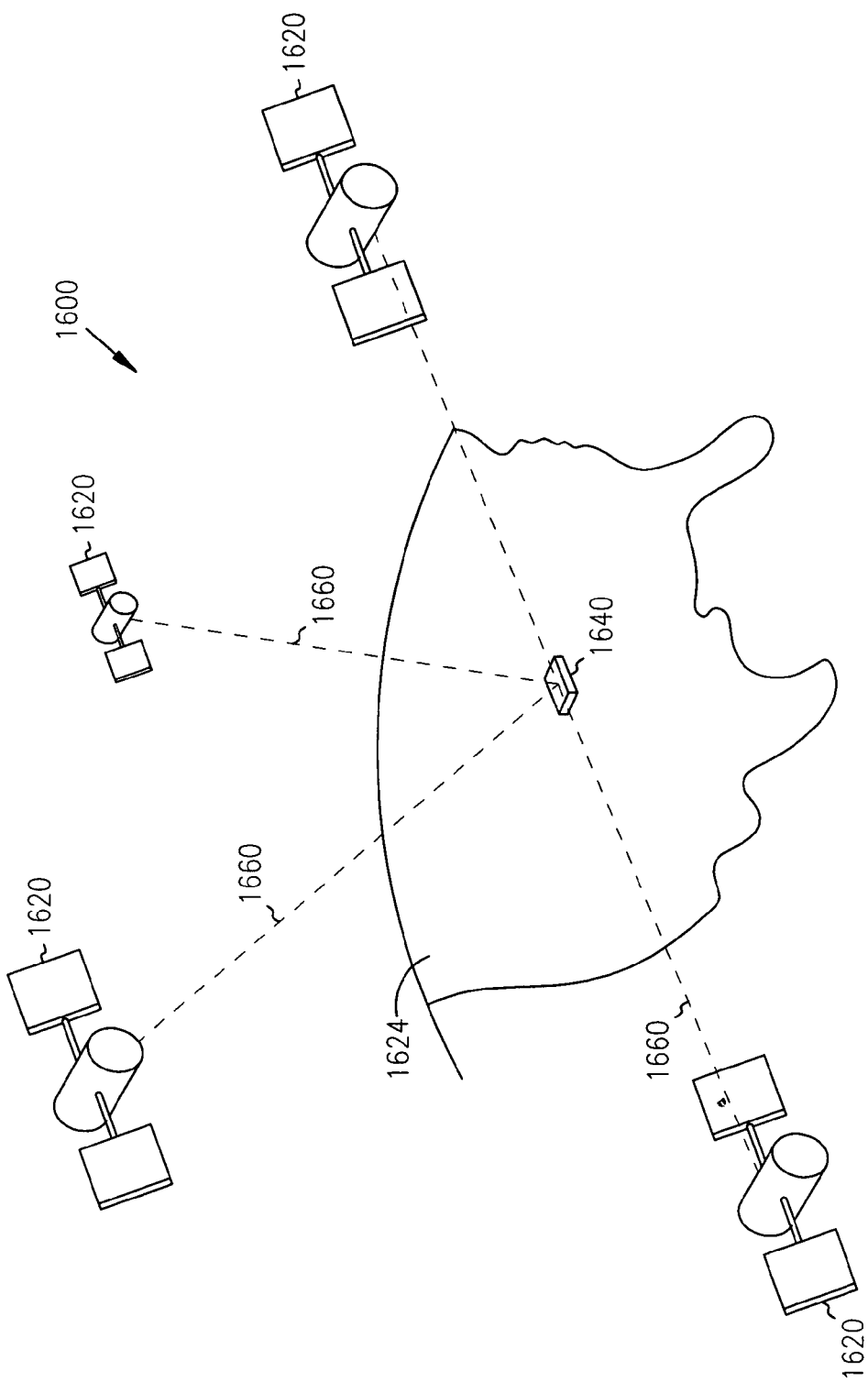
FIG. 16 is representative of a global positioning system (GPS)

FIG. 16 is representative of a global positioning system (GPS). The GPS 1600 includes a plurality of satellites 1620 and a GPS receiver device 1640. The plurality of satellites 1620 are in orbit about the Earth 1624. The orbit of each satellite 1620 is not necessarily synchronous with the orbits of other satellites 1620 and, in fact, is likely asynchronous. The GPS receiver device 1640 of the present invention is shown receiving spread spectrum GPS satellite signals 1660 from the various satellites 1620.

The spread spectrum signals 1660 continuously transmitted from each satellite 1620 utilize a highly accurate frequency standard accomplished with an extremely accurate atomic clock. Each satellite 1620, as part of its data signal transmission 1660, transmits a data stream indicative of that particular satellite 1620. It will be appreciated by those skilled in the relevant art that the GPS receiver device 1640 must acquire spread spectrum GPS satellite signals 1660 from at least three satellites 1620 for the GPS receiver device 1640 to calculate its two-dimensional position by triangulation. Acquisition of an additional signal 1660, resulting in signals 1660 from a total of four satellites 1620, permits GPS receiver device 1640 to calculate its three-dimensional position.

Any receiving device capable of receiving the location from at least three transmitting locations is capable of performing basic triangulation calculations to determine the relative position of the receiving device with respect to the transmitting locations. For example, at least three cellular towers can each transmit their location information to a receiving cellular phone, or any other receiving device, and if the phones or devices are equipped to perform the triangulation algorithm, then the location of the cellular phone or device can be readily resolved. By further way of example, an amusement park or entertainment facility can deploy three or more transmitting radio frequency devices and provide users with receiving units capable of performing a triangulation algorithm to determine the receiving units location within the amusement park or entertainment facility. The present invention is not limited to GPS receivers or to other GPS systems with GPS capabilities.

The present invention also is capable of incorporating other systems and methods for detecting a position. For example, the present invention is capable of incorporating dead reckoning technology to identify track log points. Examples of dead reckoning components include, but are not limited to, rate gyros, inertial navigation systems, compass, odometers and speedometers. The invention is not so limited, however, to a particular type of dead reckoning component. Dead reckoning functionality is capable of being incorporated with triangulation position functionality so as to provide reliable navigation when a primary positioning service is interrupted.

Figure 17A:
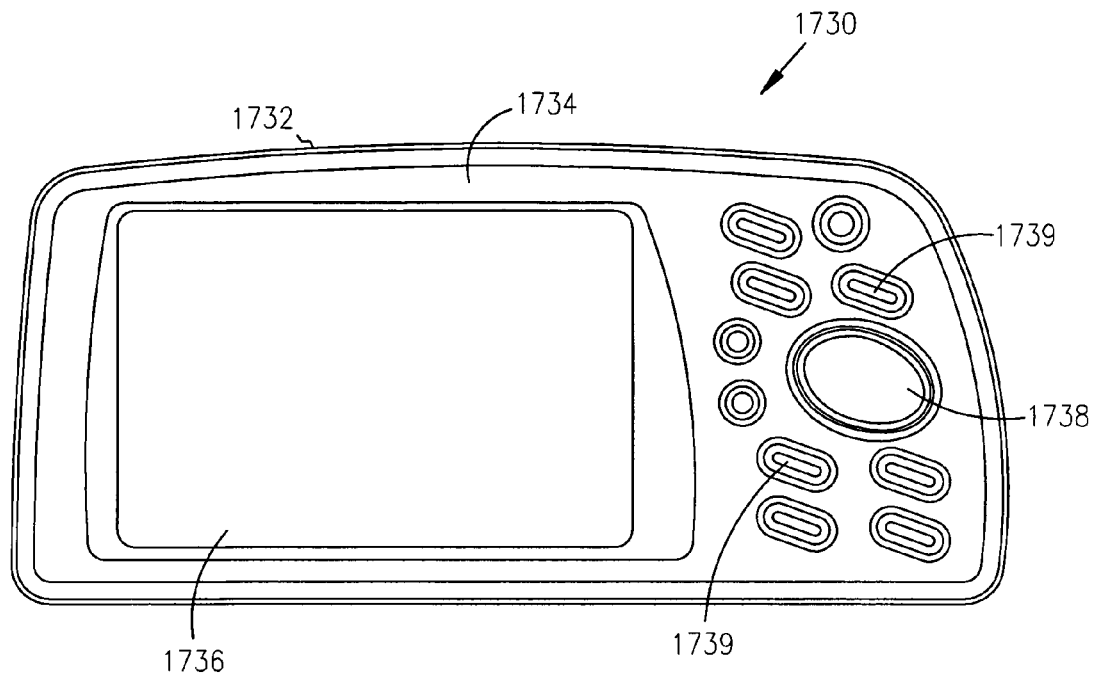
FIGS. 17A and 17B illustrate views for one embodiment of an electronic navigational device.
Figure 17B:
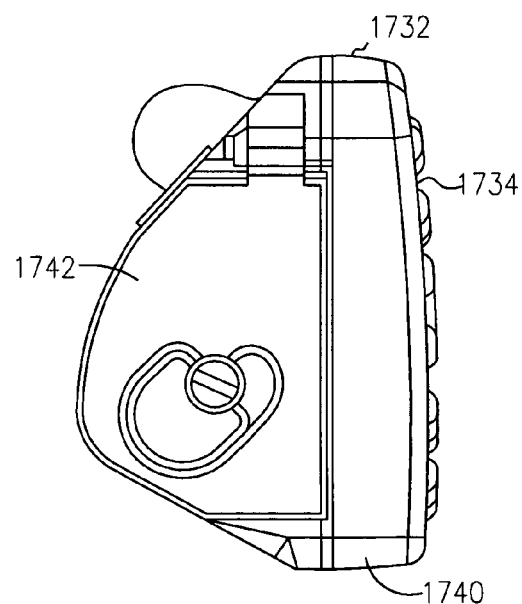

FIGS. 17A and 17B illustrate views for one embodiment of an electronic navigational device 1730 according to the teachings of the present invention. As one of ordinary skill in the art will understand upon reading this disclosure, the device can be portable and can be utilized in any number of implementations such as automobile, personal marine craft, and avionic navigation. In the embodiment of FIG. 17A a front view of the navigational device 1730 is provided showing the navigational device has a generally rectangular housing 1732. The housing 1732 is constructed of resilient material and has been rounded for aesthetic and ergonomic purposes. As shown in FIG. 17A, the control face 1734 has access slots for an input key pad 1738, other individual keys 1739, and a display screen 1736. In one embodiment, the display screen 1736 is a LCD display which is capable of displaying both text and graphical information. The invention, however, is not so limited.

In FIG. 17B, a side view of the navigational device 1730 is provided. FIG. 17B illustrates that the device's housing 1732 is defined by an outer front case 1740 and a rear case 1742. As shown in FIG. 17B, the outer front case 1740 is defined by the control face 1734. In the embodiment shown in FIG. 17B, the outer front case 1740 and the rear case 1742 are made of separate molded pieces to form the device housing 1732 and support input key pad 1738, other individual keys 1739, and display screen 1736 in respective access slots shown in the control face 1734 of FIG. 17A.

Figure 18A:
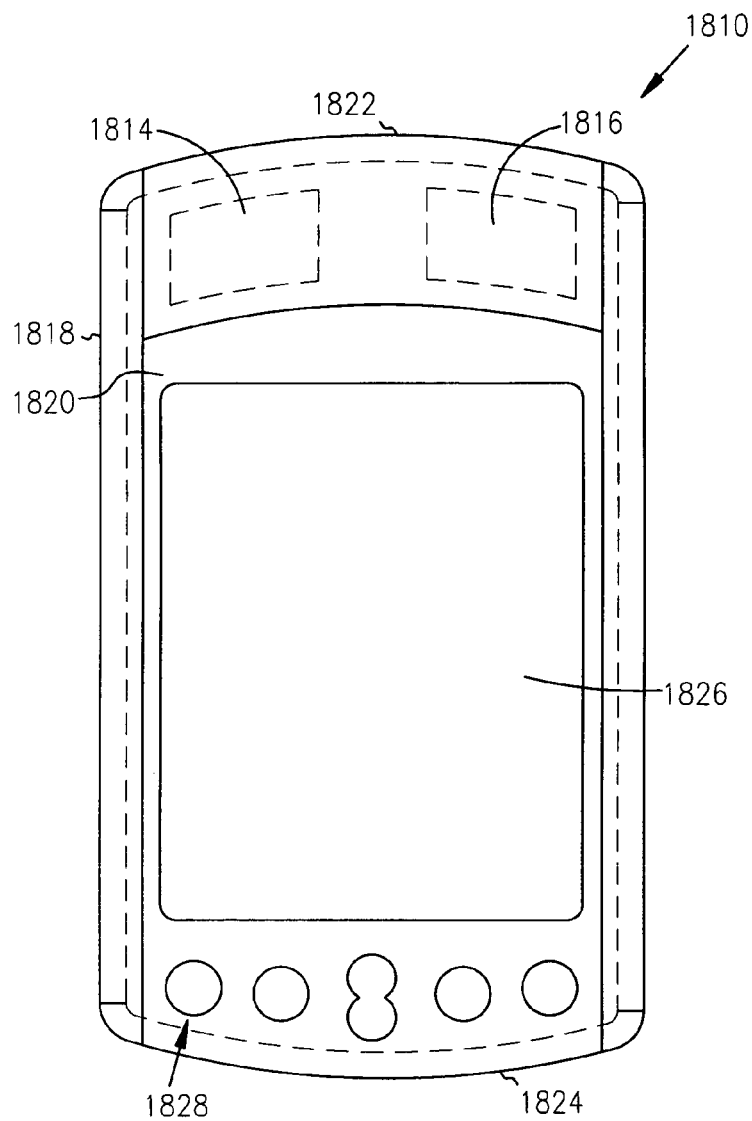
FIGS. 18A-18C illustrate views for another embodiment of an electronic navigational device.
Figure 18B:
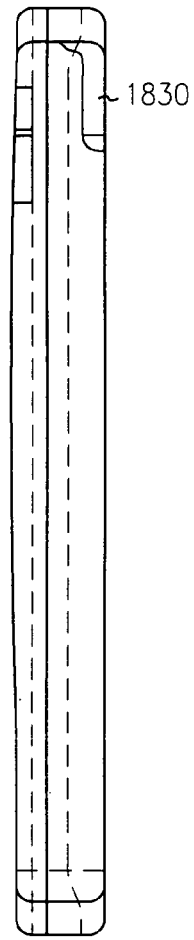
Figure 18C:
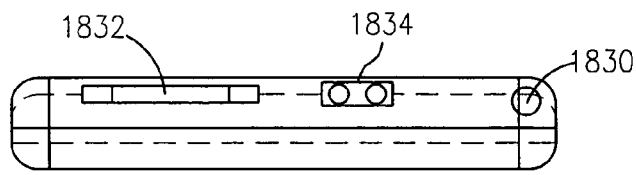

FIGS. 18A-18C illustrate views for another embodiment of an electronic navigational device 1810 according to the teachings of the present invention. The navigational device 1810 shown in FIGS. 18A-18C includes a personal digital assistant (PDA) with integrated GPS receiver and cellular transceiver according to the teachings of the present invention. It is noted that the present invention also is capable of being incorporated into a PDA or other device without GPS capabilities, as it is desirable, for certain applications, to provide these devices with the capability to select a portion of a track log. The GPS integrated PDA operates with an operating system (OS) such as, for example, the well-known Palm or Pocket PC operating systems, or the lesser-used Linux OS. As shown in the top view of FIG. 18A, the GPS integrated PDA 1810 includes an internal integrated GPS patch antenna 1814 and a cellular transceiver 1816 contained in a housing 1818. The housing 1818 is generally rectangular with a low profile and has a front face 1820 extending from a top end 1822 to a bottom end 1824. Mounted on front face 1820 is a display screen 1826, which is touch sensitive and responsive to a stylus 1830 (shown stored in the side view of FIG. 18B) or a finger touch. FIGS. 18A-18C illustrate the stylus 1830 nested within housing 1818 for storage and convenient access in a conventional manner. The embodiment shown in FIG. 18A illustrates a number of control buttons, or input keys 1828 positioned toward the bottom end 1824. The invention, however, is not so limited and one of ordinary skill in the art will appreciate that the input keys 1828 can be positioned toward the top end 1822 or at any other suitable location. The end view of FIG. 18C illustrates a map data cartridge bay slot 1832 and headphone jack 1834 provided at the top end 1822 of the housing 1818. Again, the invention is not so limited and one of ordinary skill in the art will appreciate that a map data cartridge bay slot 1832 and headphone jack 1834 can be provided at the bottom end 1824, separately at opposite ends, or at any other suitable location.

The structure of GPS integrated PDA 1810 is shown as illustrative of one type of GPS integrated devices. Other physical structures, such as a cellular telephone and a vehicle-mounted unit are contemplated within the scope of this invention.

FIGS. 17A-17B and 18A-18C are provided as illustrative examples of hardware components for a navigational device according to the teachings of the present invention. However, the invention is not limited to the configuration shown in FIGS. 17A-17B and 18A-18C. One of ordinary skill in the art will appreciate other suitable designs for a hardware device which can accommodate the present invention.

Figure 19A:
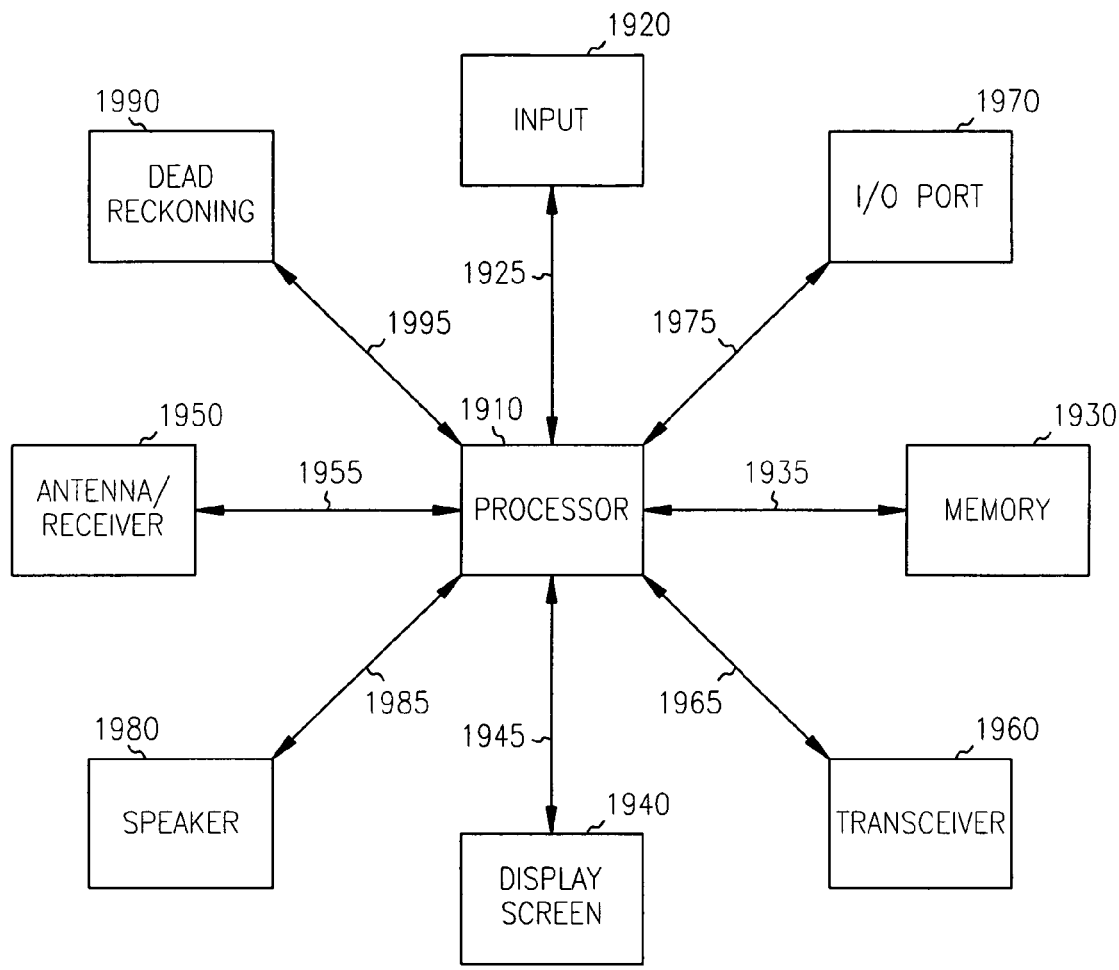
FIG. 19A is a block diagram of one embodiment for the electronic components within the hardware of FIGS. 18A-18C.

FIG. 19A is a block diagram of one embodiment for the electronic components within the hardware of FIGS. 17A-17B utilized by the electronic navigational device according to the present invention. In the embodiment shown in FIG. 19A, the electronic components include a processor 1910 which is connected to an input 1920, such as keypad via line 1925. It will be understood that input 1920 may alternatively be a microphone for receiving voice commands. Processor 1910 communicates with memory 1930 via line 1935. Processor 1910 also communicates with display screen 1940 via line 1945. An antenna/receiver 1950, such as a GPS antenna/receiver is connected to processor 1910 via line 1955. It will be understood that the antenna and receiver, designated by reference numeral 1950, are combined schematically for illustration, but that the antenna and receiver may be separately located components, and that the antenna may be a GPS patch antenna or a helical antenna. The electronic components further include I/O ports 1970 connected to processor 1910 via line 1975. A transceiver 1960 is coupled to the processor 1910 via line 1965. Various transceivers are capable of being used. The transceiver type is chosen according to the application and the desired communication media. According to one embodiment, a speaker 1980 is connected to the processor 1910 via line 1985, and the device is adapted to provide voice guidance or instructions through the speaker 1980. According to one embodiment, the device is adapted to be connected to an auxiliary speaker, such as a speaker from a car stereo, earphones or an earpiece, and is adapted to provide voice guidance or instructions through the auxiliary speaker. One embodiment includes at least one dead reckoning component 1990 connected to the processor 1910 via line 1995.

Figure 19B:
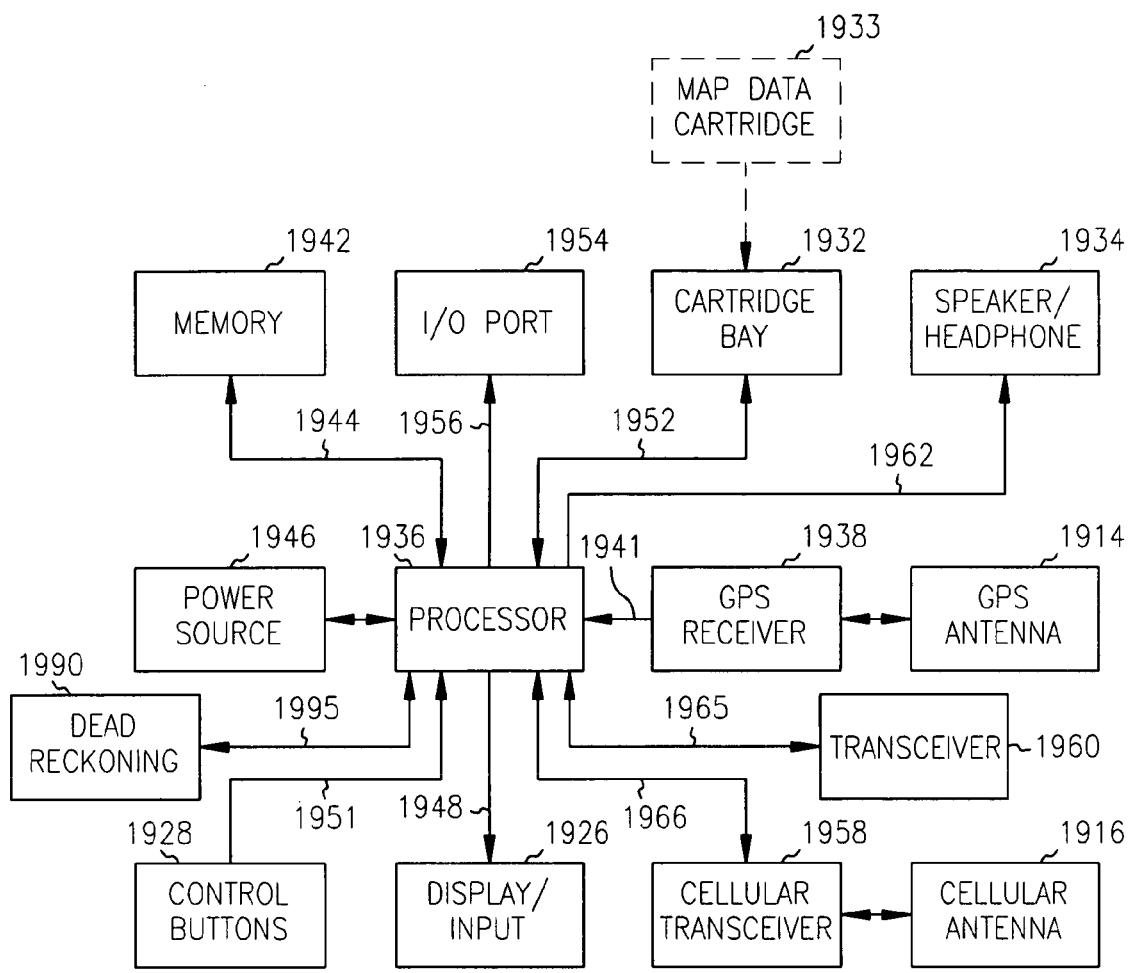
FIG. 19B is a block diagram of one embodiment for the electronic components within the hardware of FIGS. 18A-18C.

FIG. 19B is a block diagram of one embodiment for the electronic components within the hardware of FIGS. 18A-18C and utilized by the GPS integrated PDA 1810 according to the teachings of the present invention. The electronic components shown in FIG. 19B include a processor 1936 which is connected to the GPS antenna 1914 through GPS receiver 1938 via line 1941. The processor 1936 interacts with an operating system (such as PalmOS; Pocket PC) that runs selected software depending on the intended use of the PDA 1910. Processor 1936 is coupled with memory 1942 such as RAM via line 1944, and power source 1946 for powering the electronic components of PDA 1810. The processor 1936 communicates with touch sensitive display screen 1926 via data line 1948.

The electronic components further include two other input sources that are connected to the processor 1936. Control buttons 1928 are connected to processor 1936 via line 1951 and a map data cartridge 1933 inserted into cartridge bay 1932 is connected via line 1952. A conventional serial I/O port 1954 is connected to the processor 1936 via line 1956. Cellular antenna 1916 is connected to cellular transceiver 1958, which is connected to the processor 1936 via line 1966. Processor 1936 is connected to the speaker/headphone jack 1934 via line 1962. The PDA 1810 may also include an infrared port (not shown) coupled to the processor 1936 that may be used to beam information from one PDA to another. A transceiver 1960 is adapted to communicate with the processor 1936 via line 1965. In one embodiment, the transceiver 1960 is capable of being used to transmit and receive navigation data between a portable and/or handheld electronic device and another portable and/or handheld device. In another embodiment, the transceiver 1960 is capable of being used to transmit and receive navigation data via a commercial communications network, such as an analog cellular network using plain old telephone service (POTS), a digital packet switched cellular network such as a personal communications service (PCS) network, the Internet using Internet Protocol (IP), a wide area network (WAN) using hardwire and/or wireless communication channels, and the like. The present invention is not limited to a particular type of network. One embodiment includes at least one dead reckoning component 1990 connected to the processor 1910 via line 1995.

In one embodiment of a GPS integrated PDA with cellular communication capabilities, the exact position of one PDA is capable of being displayed on another PDA unit or electronic device that has cellular communication capabilities and has the capability of receiving and displaying location information. The NavTalk device manufactured by GARMIN International is one such device that has the capability of receiving and displaying such location information. According to the present invention, these PDAs are capable of communicating track log data and desired track logs to one another.

As will be understood by one of ordinary skill in the art, the electronic components shown in FIGS. 19A and 19B are powered by a power source in a conventional manner. As will be understood by one of ordinary skill in the art, different configurations of the components shown in FIGS. 19A and 19B are considered within the scope of the present invention. For example, in one embodiment, the components shown in FIGS. 19A and 19B are in communication with one another via wireless connections and the like. Thus, the scope of the navigation device of the present invention includes a portable electronic navigational aid device.

According to one embodiment, the processor 1910 and memory 1930 cooperate to identify or determine a desired track log from a set of track log points. In one embodiment, the memory 1930 includes cartographic data (such as map features and waypoints), the set of track log points, and algorithms for determining the desired track log from the set of track log points. One embodiment of the navigational device includes a display 1940 that is adapted to communicate with the processor 1910 and is capable of showing track logs and menus/display boxes that allow a user to select one or more endpoints for a set of track log data.

Figure 20:
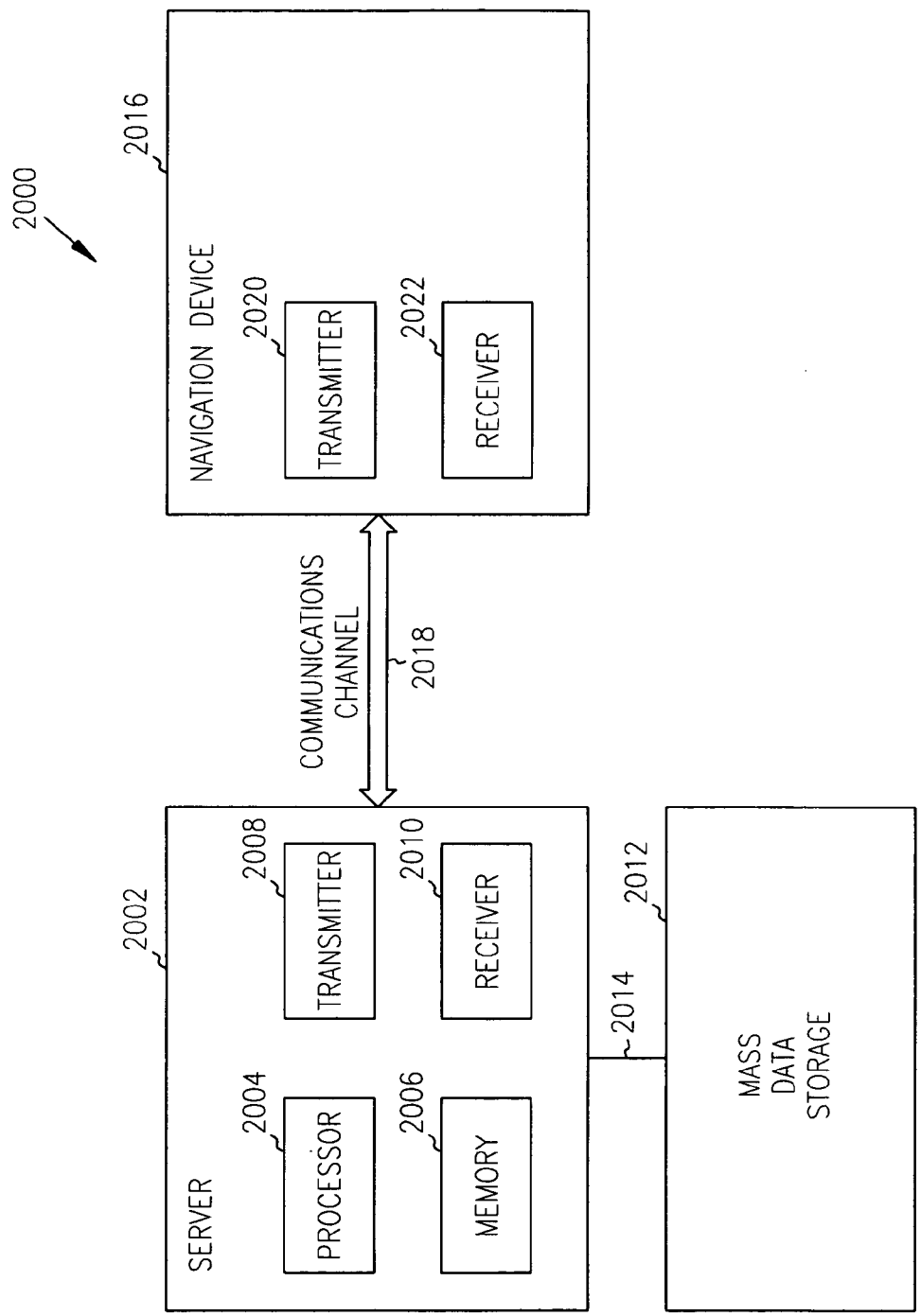
FIG. 20 is a block diagram of a navigation system.

FIG. 20 is a block diagram of an embodiment of a navigation system. The navigation system 2000 includes a server 2002. According to one embodiment, the server 2002 includes a processor 2004 operably coupled to memory 2006, and further includes a transmitter 2008 and a receiver 2010 to send and receive communication signals. The transmitter 2008 and receiver 2010 are selected or designed according to the communication requirements and the communication technology used in the communication design for the navigation system. The functions of the transmitter 2008 and the receiver 2010 may be combined into a single transceiver.

The navigation system further includes a mass data storage 2012 coupled to the server 2002 via communication link 2014. The mass data storage 2012 contains a store of navigation data. According to one embodiment, this store of navigation includes track log data points and desired track logs for one or up to a very large number of users. One of ordinary skill in the art will understand, upon reading and comprehending this disclosure, that the mass data storage 2012 can be a separate device from the server 2002 or can be incorporated into the server 2002.

The navigation system further includes a navigational aid device 2016 adapted to communicate with the server 2002 through the communication channel 2018. According to one embodiment, the navigational aid device 2016 includes a processor and memory, as previously shown and described with respect to the block diagram of FIG. 19A and FIG. 19B. Furthermore, the navigational aid device 2016 includes a transmitter 2020 and receiver 2022 to send and receive communication signals through the communication channel 2018. The transmitter 2020 and receiver 2022 are selected or designed according to the communication requirements and the communication technology used in the communication design for the navigation system. The functions of the transmitter 2020 and receiver 2022 may be combined into a single transceiver. In one embodiment, the device 2016 is adapted to communicate directly to another device (not shown) using the transmitter 2020 and receiver 2022 or another dedicated transceiver (not shown). One example of a transceiver for communicating with another device was described earlier with respect to transceiver 1960 in FIG. 19B

Software stored in the server memory 2006 provides instructions for the processor 2004 and allows the server 2002 to provide services to the navigational aid device 2016. One service provided by the server 2002 involves processing requests from the navigational aid device 2016 and transmitting navigation data (such as track log points) from the mass data storage 2012 to the navigational aid device 2016. According to one embodiment, another service provided by the server 2002 includes processing the navigation data using various algorithms for a desired application, and sending the results of these calculations to the navigational aid device 2016.

The communication channel 2018 is the propagating medium or path that connects the navigational aid device 2016 and the server 2002. According to one embodiment, both the server 2002 and the navigational aid device 2016 include a transmitter for transmitting data through the communication channel and a receiver for receiving data that has been transmitted through the communication channel.

The communication channel 2018 is not limited to a particular communication technology. Additionally, the communication channel 2018 is not limited to a single communication technology; that is, the channel 2018 may include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 2018 includes telephone and computer networks. Furthermore, in various embodiments, the communication channel 2016 is capable of accommodating wireless communication such as radio frequency, microwave frequency and infrared communication, and the like. Additionally, according to various embodiments, the communication channel 2016 accommodates satellite communication.

The communication signals transmitted through the communication channel 2018 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), and the like. Both digital and analog signals may be transmitted through the communication channel 2018. According to various embodiments, these signals are modulated, encrypted and/or compressed signals as may be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory.

According to one embodiment of the navigation system, the 2002 server includes a remote server accessed by the navigational aid device 2016 through a wireless channel. According to other embodiments of the navigation system, the server 2002 includes a network server located on a local area network (LAN), wide area network (WAN), a virtual private network (VPN) and server farms.

According to another embodiment of the navigation system, the server 2002 includes a personal computer such as a desktop or laptop computer. In one embodiment, the communication channel 2018 is a cable connected between the personal computer and the navigational aid device. According to one embodiment, the communication channel 2018 is a wireless connection between the personal computer and the navigational aid device 2016.

The system performs various processes according to the teachings of the present invention as previously described above with respect to FIGS. 2-15. According to one embodiment, the mass data storage 2012 is adapted to store navigation data, including track log points. According to various embodiments, the navigation data includes text, images and/or audio. The server 2002 communicates with the mass data storage 2012, and thus is able to access and/or process the navigation data. The navigational aid device 2016 communicates with and retrieves navigation data from the server 2002 via a communication channel 2018.

The navigational aid device 2016 includes a processor and a memory connected to the processor. According to one embodiment, the processor and memory of the navigational aid device 2016 are adapted to provide and perform algorithms or instructions to identify a desired track log based on selected endpoints from a set of track log points.

According to another embodiment, the processor 2004 and memory 2006 of the server 2002 are adapted to provide and perform the algorithms or instructions to identify or determine the desired track log from selected endpoints. The navigational aid device 2016 stores track log points on the server 2002, and is further adapted to provide the selected endpoints to the server 2002 and receive this data from the server 2002 through the communication channel 2018. According to one embodiment, the algorithms filter the track log points to reduce the number of track log points for the desired track log that is to be communicated to the device.

The present invention may also be described in the context of computer-executable instructions, such as program modules, being executed by a computer. Generally, program modules include routines, programs, objects, components, data structures, etc. that perform particular tasks or implement particular abstract data types.

As one of ordinary skill in the art will understand upon reading and comprehending this disclosure, any one or more of the above features can be combined into a particular embodiment of the invention. Likewise, in the invention any one or a combination of the above functions can be optionally de-activated in the device. One of ordinary skill in the art will further understand that the method includes using a computer accessible medium having a set of computer executable instructions operable to perform the method. Other embodiments may be utilized and structural, logical, and electrical changes may be made without departing from the scope of the present invention.

In some embodiments, the methods provided above are implemented as a computer data signal embodied in a carrier wave or propagated signal that represents a sequence of instructions which, when executed by a processor, such as processor 1936 in FIG. 19B, cause the processor to perform the respective method. In other embodiments, methods provided above are implemented as a set of instructions contained on a computer-accessible medium, such as memory 1942 in FIG. 19B, capable of directing a processor, such as processor 1936 in FIG. 19B, to perform the respective method. In varying embodiments, the medium includes a magnetic medium, an electronic medium, or an optical medium.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to systems, devices and methods for selecting a desired track log from a set of track log points. The present invention provides features that allow a user to select desired endpoints for the desired track log, such that the desired track log is not limited to the end portion of an active track log. The features of the present invention also provide the capability of selecting at least one of the desired endpoints from a location. The systems, devices and methods of the present invention allow electronic systems, such as navigational aid devices, to provide more powerful and flexible applications.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A navigational aid device, comprising:
a processor; and
a memory to communicate to the processor,
wherein the memory includes a set of track log points corresponding to a first track log, the track log points indicating a plurality of previous locations of the navigational aid device,
wherein the device selects a desired track log from the set of track log points corresponding to the first track log by:
receiving user-specified desired endpoints for the desired track log based on a user-specified time of at least one track log endpoint;
assigning actual endpoints for the desired track log based on the user-specified time for the desired endpoints and the set of track log points; and
identifying the desired track log using the actual endpoints and at least one track log point from the set of track log points.

2. The device of claim 1, wherein the navigational aid device includes a portable navigational aid device.

3. The device of claim 1, wherein the navigational aid device includes a wireless communication device.

4. The device of claim 1, wherein the navigational aid device includes a Global Positioning System (GPS) receiver device.

5. The device of claim 1, wherein the navigational aid device includes a Personal Digital Assistant (PDA).

6. The device of claim 1, wherein the device:
searches for a nearest track log point that is located closest to at least one of the desired endpoints that is specified by a location;
identifies a time associated with the nearest track log point; and
finds an index of the nearest track log point in a time range.

7. The device of claim 1, further including a display for presenting a visual indication of the desired track log.

* * * * *